United States Patent [19]

Mackinnon

[11] Patent Number: 5,366,789
[45] Date of Patent: Nov. 22, 1994

[54] SHEET MATERIAL

[75] Inventor: Robin Mackinnon, London, United Kingdom

[73] Assignee: Marketech Limited, London, United Kingdom

[21] Appl. No.: 941,061

[22] PCT Filed: Apr. 12, 1991

[86] PCT No.: PCT/GB91/00583
§ 371 Date: Dec. 17, 1992
§ 102(e) Date: Dec. 17, 1992

[87] PCT Pub. No.: WO91/16243
PCT Pub. Date: Oct. 31, 1991

[30] Foreign Application Priority Data

Apr. 17, 1990 [GB] United Kingdom ............... 9008539

[51] Int. Cl.$^5$ .............................................. B32B 1/00
[52] U.S. Cl. .................................... 428/178; 428/166; 428/188
[58] Field of Search ................... 428/178, 35.7, 134, 428/136, 156, 188, 166; 267/136, 140, 141; 248/632, 633, 634

[56] References Cited

U.S. PATENT DOCUMENTS 4,776,573 11/1988 Wolf ................................. 428/178

FOREIGN PATENT DOCUMENTS 1925744 11/1969 Germany .
1130598 10/1968 United Kingdom .
1303502 1/1973 United Kingdom .

Primary Examiner—Donald J. Loney
Attorney, Agent, or Firm—Sheridan Ross McIntosh

[57] ABSTRACT

A plastic sheet material comprising a pair of opposed faces between which run a series of elongate voids, the voids being arranged such that there are a series of uninterrupted interconnections between the two opposite faces. The voids are of a cross-sectional shape such that there is a substantial absence of sharp corners. Where the voids are not in themselves round, the corners are radiussed. In a preferred construction, two series of interconnections are provided which join one another where they meet. The construction is particularly useful in packaging, especially the packaging of food products. The present invention has high buckling resistance in both the machine and cross-machine directions and is particularly resistant to torsional stresses, compression and/or extension and demonstrates good impact resistance.

9 Claims, 3 Drawing Sheets

SHEET MATERIAL

FIELD OF THE INVENTION

This invention relates to a sheet material and in particular relates to an extruded plastics sheet material having voids therein.

1. Background of the Invention

Plastics material sheeting is useful for a number of end uses. Rigid or semi-rigid plastics material sheeting may be used, for example, as a packaging material or a cladding material. However, in order to get the best physical properties at least cost, it is preferable that the sheet not be solid and profiled sheets having opposed walls separated by lateral support members have been proposed hitherto. While such structures have greater strength than a solid sheet of equivalent weight, they still have drawbacks. In particular, local failure is likely to result in complete failure of the structure either immediately or by 'creep'.

2. Summary of the Invention

The invention seeks to provide a form of plastics material sheet improved in the above respects and which can be produced conveniently and economically.

According to the present invention there is provided a plastics sheet material which comprises a pair of opposed faces between which run a series of elongate voids, the voids being arranged so that there are a series of uninterrupted interconnections between the two opposite faces and the voids being of a cross sectional shape such that there is a substantial absence of sharp corners.

The voids will in practice be parallel to one another and run the length of the sheet material, thus the material can be produced in one pass by extrusion from a die. This means that the material can be produced potentially much cheaper than, for example, an equivalent laminated product. In many cases products can be produced which could not be made by lamination. Furthermore, being produced in one piece, the structural integrity is greater and the variety of configurations which may be employed is very high. The opposed faces may both be external faces, or one or more may be an internal face if the sheet is of a more involved cross-sectional profile.

The interconnections are preferably arranged such that they do not meet the faces at or near right angles but are inclined to the transverse axis of the sheet. Furthermore it is preferred to provide at least two series of interconnections which join one another where they cross, and indeed are extruded integrally. The voids may be enlarged so as to virtually fill the space between the faces leaving only relatively thin interconnections which act like leafs, ribs or beams between the opposed faces. Where the construction is employed it is important that the connection between each beam and the adjacent face is radiussed to avoid sharp angles for the reasons explained more fully hereinafter.

The plastics material employed is preferably a thermo plastic and the sheet maybe formed from many suitable thermo plastics material such as a polyolefin eg polyethylene or polypropelene. Other thermo plastic materials may be employed if desired, as may fillers, colourants and the like.

The thickness of the sheet and cross sectional shape of the voids will be chosen with regard to cost constraints together with the desired mechanical attributes of the finished sheet. The size and number of the voids will be chosen with similar considerations in mind. These considerations might be modified by considerations of ease of manufacture. As compared with a sheet of equivalent dimensions and weight made form the same polymer, the voids in the constructions of the invention enable a lighter and cheaper sheet to be made without impairing its strength owing to the presence of the interconnecting lattice work between the opposed faces. Avoiding sharp corners or angles in the cross sectional shape materially contributes to the mechanical properties of the finished sheet,. In particular, it enhances resistance to torsion, buckling, particularly in the machine direction and impact force while avoiding points at which fractures are likely to start and from which they are likely to be propogated. Thus, as compared with a sheet of equivalent weight and dimensions made from the same polymeric material, local failure is less likely to occur, if it does occur it is less likely to result in complete failure of the structure, and also if it should occur it is less likely to creep. The pattern of voids within the sheet material will preferably be a repeating pattern, but need not be.

The interconnections between the opposed faces preferably form a criss-cross or trellis-work running between the voids, although this does not necessarily imply that the interconnections are in the form of straight lines. Advantageously, each interconnection runs in a generally diagonal direction making an angle of between 30° and 60°, preferably about 45° with the opposed faces, and adjacent interconnections run in opposite directions to achieve the 'criss-cross' effect.

BRIEF DESCRIPTION OF THE FIGURES

The invention will be described further, by way of example, with reference to the accompanying drawings, in which

FIG. 1 shows a cross-section of a portion of sheet material having a series of cylindrical voids.

FIG. 2 shows sheet material having a variety of holes having various sizes.

FIG. 3 shows a further embodiment of the present invention where the sheet material has various size holes.

FIG. 4 shows a further embodiment of the present invention in which non-circular voids are employed in the sheet material.

FIG. 5 shows sheet material having generally triangular voids and other generally square voids wherein corners are radiussed.

DETAILED DESCRIPTION OF THE INVENTION

Figure 1:
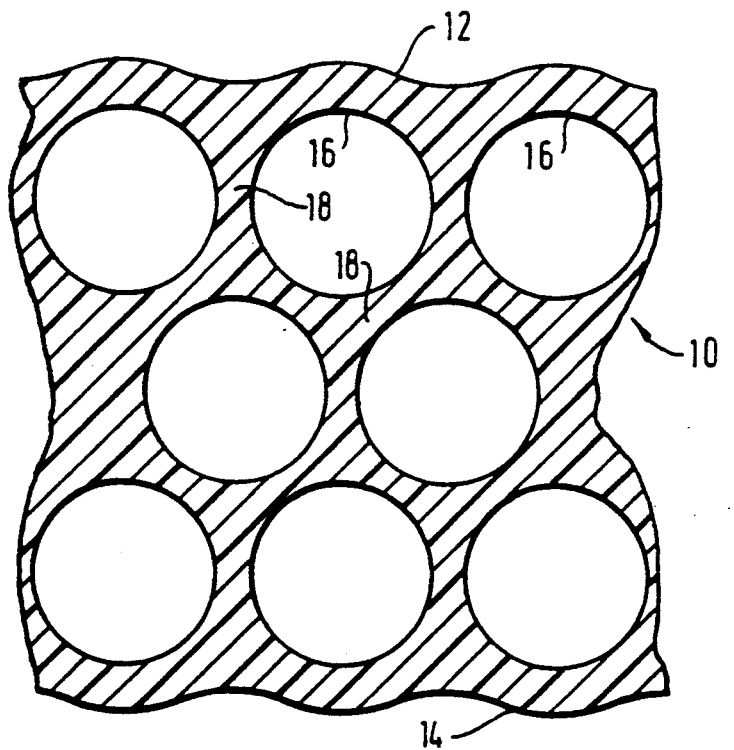
FIGS. 1 to 5 are cross sectional views of sheet materials constructed in accordance with the invention.

Referring to the drawings, and in particular FIG. 1, a portion of a sheet material generally designated 10 extruded from a thermo plastic substance such as polypropylene is shown in cross section. The sheet material 10 has opposed faces 12, 14 between which run a series of cylindrical voids 16 produced by an extrusion die. The voids 16 run in parallel from one end of the sheet material to the other. The surfaces 18 between the voids define a trellis or lattice work interconnecting the opposing faces 12 and 14. This lattice work gives structural integrity to the product. It can be seen that, although not 'line of sight' the interconnections 18 fun generally at an angle of about 45° the faces 12,14.

Figure 2:
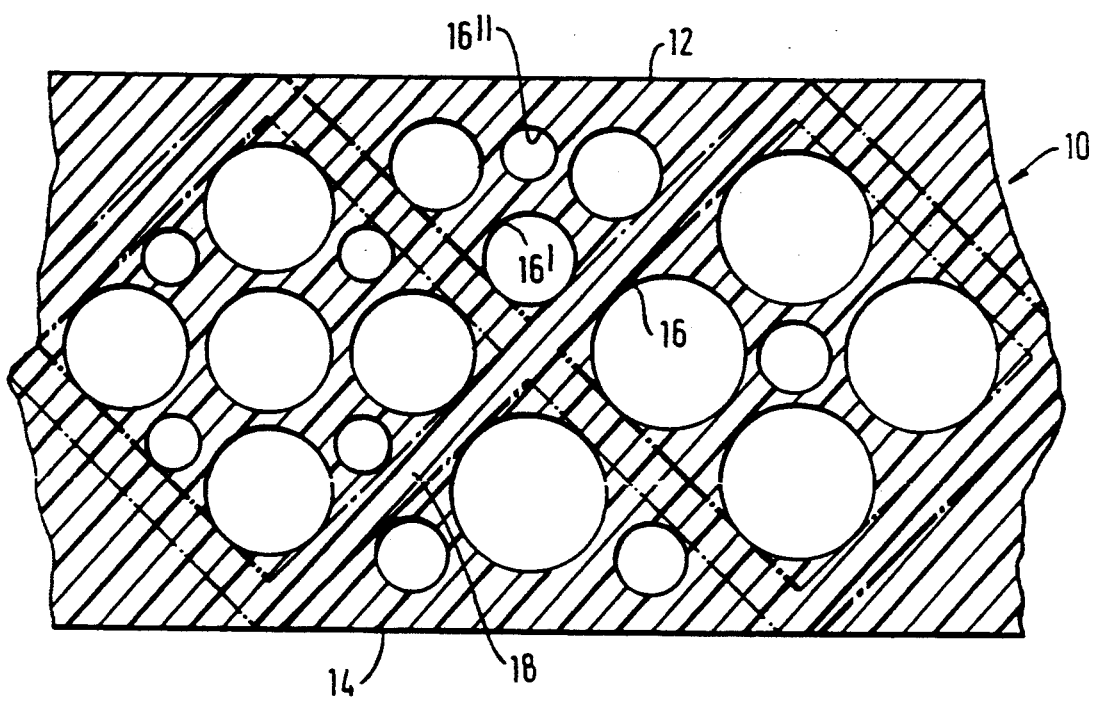

In FIG. 2 another embodiment is illustrated wherein three sizes of void 16, 16' and 16" are employed. This allows the voids to be arranged in the manner illustrated wherein the interconnecting trellis work 18 is in the form of straight lines. It will be appreciated that the lines shown on FIG. 2 are a drafting aid only and are not present in the product in practice.

Figure 3:
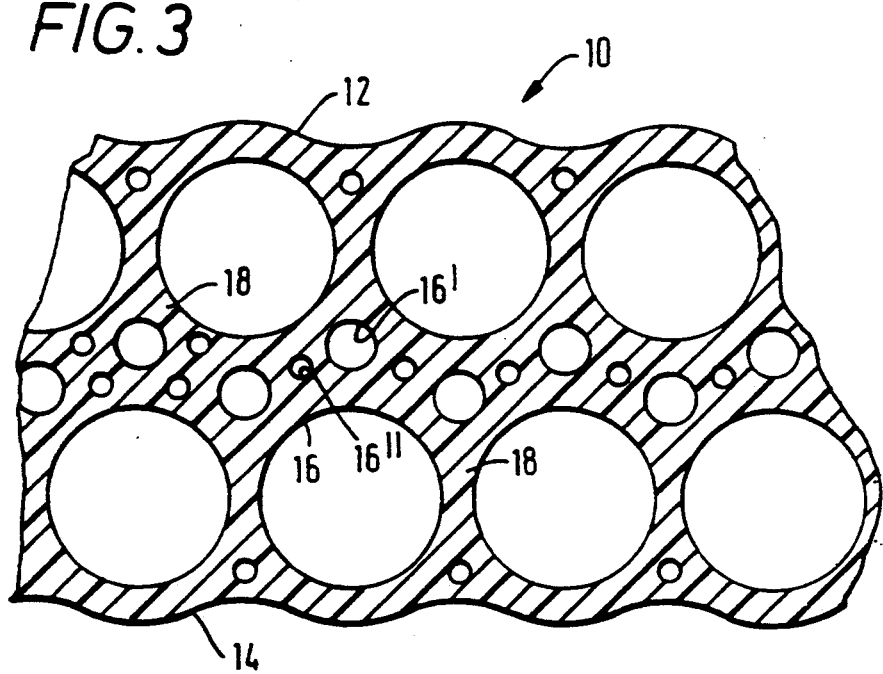

FIG. 3 illustrates a further embodiment with three different sizes of void 16.

Figure 4:
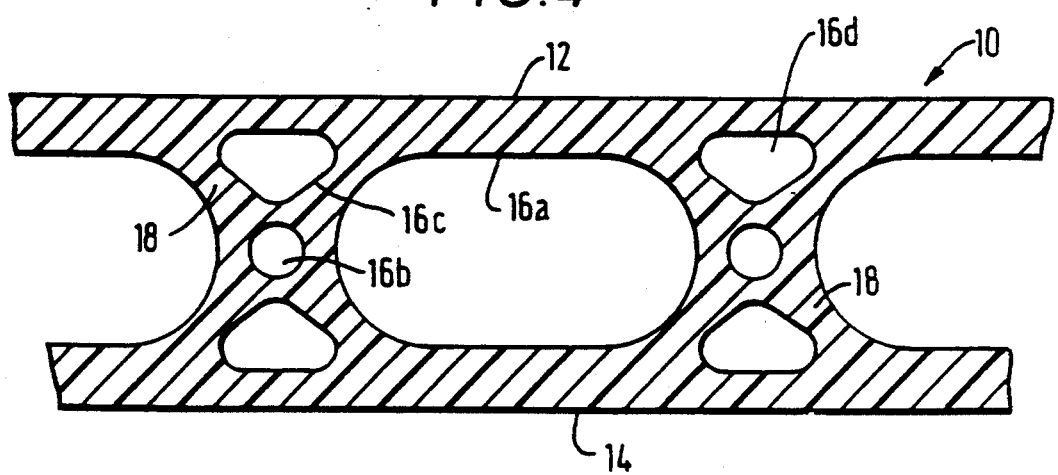

FIG. 4 illustrates yet another embodiment in which non-circular voids are employed. Elongated oval voids 16a are interspersed with small circular voids 16b and oblate spheroidal voids 16c. As illustrated the voids 16d are of a different shape from 16c but in practice one or the other shape would be chosen depending upon end use. Once again the two opposite faces 12 and 14 are interconnected by a lattice work or trellis work of interconnections 18 which criss-cross at angle of about 45° to the faces.

Figure 5:
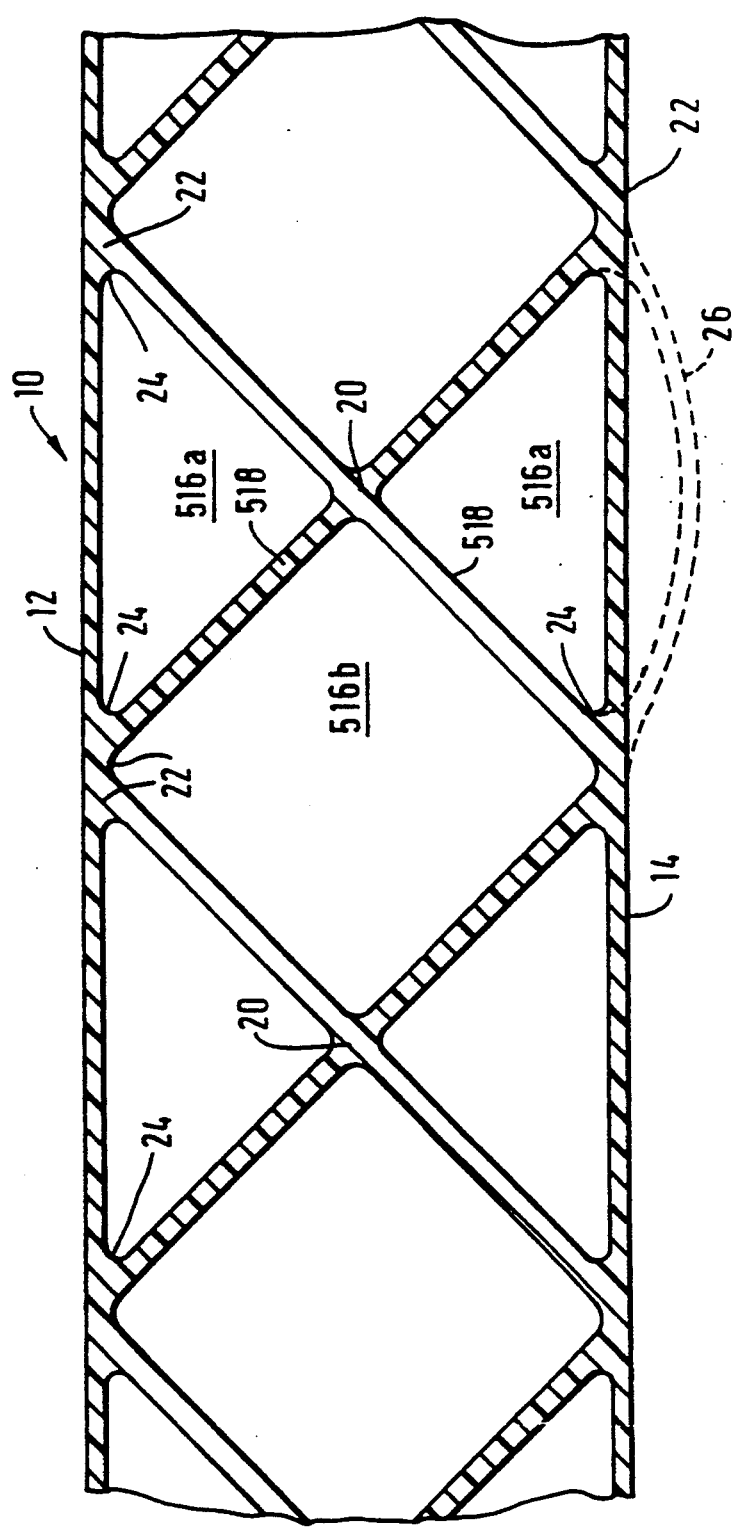

Turning now to FIG. 5, and using like numerals for like parts, voids 516a are generally triangular in section and voids 516b are generally square in section. Sharp corners are avoided by means of radiussing. The size and shape of the void is such that the interconnections are in the form of relatively thin "beams" 518 which form two interconnecting series of sawtooth wave patterns joined together at interconnections 20. The beams 518 form an angle of approximately 45°. The beams are integral with the faces 12,14 at joins 22 and the spacing between adjacent joins 22, which can be though of as the "cell" width is equivalent to the gross thickness of the sheet. If an angle less than 45° between the beams 518 and the faces 12,14 is chosen the cell width will be relatively greater than the width and, if a greater angle is chosen the cell width will be less than the width of the sheet.

As can be seen from FIG. 5 cells 516a include two angles of 45° and the effect of these is reduced by the provision of radii 24. The included angle of 90° of cells 516b is also radiussed. The angles about the join 20 are radiussed as well, although this is not as important as width the angles adjoining the faces 12,14. The thickness of the individual walls 12 and 14 and beams 518 are chosen within the overall width of the sheet 10 in accordance with manufacturing needs and operating parameters.

In the construction of FIG. 5 corners 24 should preferably have a minimum radius of 0.1 mm and preferably a radius of 0.25 mm. It has been found that the provision of a radius above this minimum effectively avoids the disadvantages relating to sharp corners discussed hereinbefore. It is preferable that the radius does not exceed, for example, 0.3 m or 0.35 mm, for cost considerations.

By way of comparison, a common form of sheet material having applications in the building industry comprises opposites faces interconnected by lateral walls at right angles to the faces thereby defining a single layer of rectangular voids. A sheet of equivalent thickness, e.g. 3 mm, in accordance with FIG. 4 above is up to a third lighter, and therefore cheaper than this prior construction. Furthermore, its resistance to failure is improved.

The following example illustrates the invention further.

A sheet suitable for making a packaging box to carry, say, 5 kg. to 10 kg. of packed fresh fruit and vegetables can be based on the construction illustrated in FIG. 5. An overall sheet thickness of 5 mm is employed and the walls 12 and 14 have a thickness of 0.18 mm to 0.2 mm. The interconnecting beams 518 have a thickness of 0.12 mm to 0.14 mm. The sheet is extruded from a thermoplastic material, which may comprise a percentage of filler, and the total weight of polymer used is in the order of 550–650 grams per square meter.

In order to increase the radius of the corners 24 illustrated in FIG. 5 the outer walls 12,14 may be "rippled" as illustrated at 26. As can be seen from FIG. 5 the radius of the adjacent corners 24 is increased considerably by this means. Also, the rippled effect increases the strength of the sheet in the "machine" or production direction. Rippling can be produced by suitable choice of extrusion die.

The sheet material of the invention may be used in a variety of end uses. It is particularly useful in packaging, especially packaging for food products. It is also useful in a variety of other end uses such as wall panels for construction purposes. The sheet material of the invention has high buckling resistance and in particular is resistant to torsional stresses, compression and/or extension and, furthermore, has good impact resistance. The structure is less subject to complete local failure (primarily by the avoidance of sharp angles) and any local failure which may occur in practice is more likely to be limited in extent and not spread to adjacent areas of the sheet. For any given thickness of sheet 10 (or for any given strength of sheet) the properties are improved in comparison with current proposals. Furthermore they can be produced often more economically than previous profiled sheet products. The heat and sound insulation properties of the sheet are good whilst its impermeability to water is excellent. The exact number, shape and size of voids employed in relation to the thickness of sheet and material used is chosen to meet particular circumstances or end use.

While various embodiments of the present invention have been described in detail, it is apparent that modifications of these embodiments will occur to those skilled in the art. However, it is to be expressly understood that such modifications and adaptions are within the scope of the present invention, as set forth in the following claims.

What is claimed is:

1. A rigid or semi-rigid sheet material which comprises a pair of opposed faces between which run a series of elongate voids, the voids being arranged so that there are at least two series of uninterrupted interconnections between the two opposite faces which join one another where they cross and characterised in that the voids are of a cross sectional shape such that there is a substantial absence of sharp corners having a minimum radius of 0.1 mm.

2. A sheet as claimed in claim 1 produced by extrusion from a die.

3. A sheet as claimed in either of claims 1 or 2 in which the interconnections are arranged such that they do not meet the faces at or near right angles but are inclined to the transverse axis of the sheet.

4. A sheet as claimed in claim 1, wherein two series of interconnections are provided which join one another where they cross.

5. A sheet as claimed in claim 1, wherein the plastics material is a polyolefin.

6. A sheet as claimed in claim 1, wherein the voids fill the bulk of the space between the faces leaving only relatively thin interconnections which act as beams between the opposed faces and in which the connections of the beams to one another or to their adjacent faces are radiussed.

7. A sheet as claimed in claim 3, wherein the angel at which the interconnections are inclined to the transverse axis of the sheet is between 30° and 60°.

8. A sheet as claimed in claim 7 in which the angle is about 45°.

9. A sheet as claimed in claim 6, wherein the faces are rippled so as to increase the radiussing of the join between the beams and the adjacent wall.

* * * * *